United States Patent [19]

Satoh

[11] 4,236,800
[45] Dec. 2, 1980

[54] CAMERA FILM STOP POSITION ADJUSTING MECHANISM

[75] Inventor: Mitsuo Satoh, Tokyo, Japan

[73] Assignee: Asahi Kogaku Kogyo Kabushiki Kaisha, Tokyo, Japan

[21] Appl. No.: 59,701

[22] Filed: Jul. 23, 1979

[30] Foreign Application Priority Data

Aug. 22, 1978 [JP] Japan .................. 53/115095[U]

[51] Int. Cl.³ .............................. G03B 1/14
[52] U.S. Cl. .................................. 354/213
[58] Field of Search ............. 354/204, 206, 212, 213

[56] References Cited

U.S. PATENT DOCUMENTS

| 2,926,574 | 3/1960 | Bethmann | 354/213 |
| 3,148,605 | 9/1964 | Peterson et al. | 354/213 |
| 3,747,494 | 7/1973 | Peters | 354/213 |
| 3,750,545 | 8/1973 | Beach | 354/213 |

*Primary Examiner*—John Gonzales

*Attorney, Agent, or Firm*—Sughrue, Rothwell, Mion, Zinn and Macpeak

[57] ABSTRACT

A film stop position adjusting mechanism with a stop lever (3) having a stop pawl (3a) engaged with a ratchet gear (2) and adapted to stop the feeding of a film. A ratchet releasing lever (7) holds the stop lever (3) at a release position, with the ratchet releasing lever having a bent portion (7a) and an extended portion (7b). A locking lever (11) has a step (11a) which engages the bent portion (7a) of the ratchet releasing lever to lock the ratchet releasing lever (7). A detection lever has a protrusion (15a) which is inserted into a perforation of the film to detect a film stop position, and an arm (15b) having a straight edge substantially perpendicular to a film feeding direction. The locking lever (11) is provided with an eccentric pin (10) whose position can be adjusted by rotation. The eccentric pin (10) is engaged with an arm (15b) of the detection lever adapted to detect a film stop position by inserting the protrusion (15a) into a film perforation. The film stop position is adjusted by changing the timing at which the step (11a) is disengaged from the bent portion (7a).

7 Claims, 5 Drawing Figures

CAMERA FILM STOP POSITION ADJUSTING MECHANISM

BACKGROUND OF THE INVENTION

This invention relates to a film stop position adjusting mechanism in a camera using a film cartridge.

It is well known in the art that, in a camera using a so-called "cartridge" incorporating a film which has one perforation per frame, the film is stopped by using a detection pawl which detects when the film reaches a predetermined position.

In a film of this type, a picture frame is exposed at a certain distance from each perforation. Therefore, if this picture frame is not coincident with the picture frame of the camera, then, the resultant picture is partly cut away. Accordingly, it is essential to accurately regulate the position of the perforation with respect to the film stop position.

Furthermore, such a film has a light shielding leader paper. When the detection pawl is inserted into a film perforation, the top end of the detection pawl is brought into contact with the leader paper. Therefore, in this operation, the position of the detection in a direction (which is the direction of the optical axis) perpendicular to the film surface is unstable. Thus, heretofore, it is difficult to stop the film at the accurate position by detecting the position of the perforation.

SUMMARY OF THE INVENTION

Accordingly, an object of the invention is to provide a film stop position adjusting mechanism simple in construction, which can accurately regulate the position of a film perforation with respect to the film stop position.

These and other objects of this invention are accomplished in a film stop position adjusting mechanism with a stop lever having a stop pawl engaged with a ratchet gear and adapted to stop the feeding of a film. A ratchet releasing lever holds the stop lever at a release position with the ratchet releasing lever having a bent portion and an extended portion. A locking lever has a step which engages the bent portion of the ratchet releasing lever to lock the ratchet releasing lever. A detection lever has a protrusion which is inserted into a perforation of the film to detect a film stop position, and an arm having a straight edge substantially perpendicular to a film feeding direction. The locking lever is provided with an eccentric pin whose positions can be adjusted by rotation. The eccentric pin is engaged with an arm of the detection lever adapted to detect as film stop position by inserting the protrusion into a film perforation. The film stop position is adjusted by changing the timing at which the step is disengaged from the bent portion.

This invention will be described in detail with respect to the drawings and the description of the preferred embodiment that follows.

BRIEF DESCRIPTION OF THE DRAWINGS

More specifically, FIG. 1 shows the state of the mechanism obtained before a film is loaded and the winding operation is effected;

FIG. 2 shows the state of the mechanism obtained after the film is loaded but before the winding operation is completed;

FIG. 3 shows the state of the mechanism obtained during the winding operation but before the winding operation is completed;

FIG. 4 shows the state of the mechanism obtained after the winding operation is completed.

DESCRIPTION OF THE PREFERRED EMBODIMENT

Figure 1:
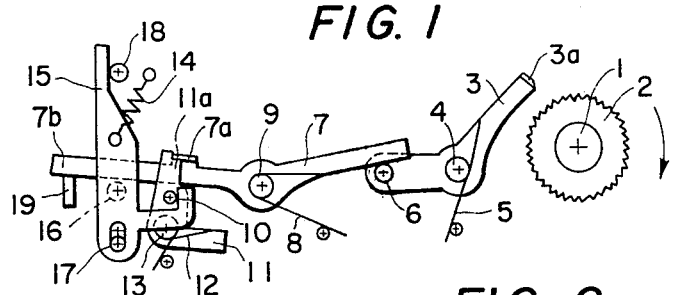
FIGS. 1 through 4 are plan views showing the various states of one example of a film stop position adjusting mechanism according to the invention.

This invention will now be described in detail with reference to the accompanying drawings. Referring to FIG. 1, reference numeral 1 designates a winding shaft; 2 is a ratchet gear which is rotated in the direction of the arrow together with the winding shaft 1. A stop lever 3 is energized to turn clockwise about a shaft 4 by a spring 5. The stop lever 3 has a stop pawl 3a at one end confronting the ratchet gear 2 and a pin 6 embedded in the other end. A ratchet releasing lever 7 is energized to turn counterclockwise around a shaft 9 by a spring 8. The ratchet releasing lever 7 has a bent portion 7a and an extended portion 7b.

Figure 5:
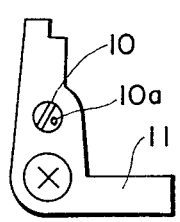
FIG. 5 is a diagram showing an eccentric pin shown in FIGS. 1 through 4.

Referring further to FIG. 1, a lock lever 11 is energized to turn clockwise around a shaft 13 by a spring 12. The locking lever 11 has a step 11a which cooperates with the bent portion 7a to lock the ratchet releasing lever 7. An eccentric pin 10 is embedded in the locking lever 11 in such a manner that its position can be adjusted by turning it around a shaft 10a, as shown in FIG. 5.

Although the shaft 10a is positioned apart from the axial center of the pin 10, it is apparent that it could be centered and the pin provided with eccentric or cam shaped surfaces to achieve the same result.

A detection lever 15 has a protrusion 15a. A pin 16 is embedded in the detection lever 15 to confront the extended portion 7b of the releasing lever 7. One part of the detection lever 15 extends to the right to form an arm 15b, the left edge of which is a straight line substantially perpendicular to the film surface and confronts the eccentric pin 10. The detection lever 15 is provided with a guide shaft 17 which is inserted in an elongated hole formed in the detection lever 15, so that the detection lever 15 is vertically moved along the elongated hole. A detection lever spring 14 is provided to energize the detection lever 15 upwardly to the right.

Figure 2:
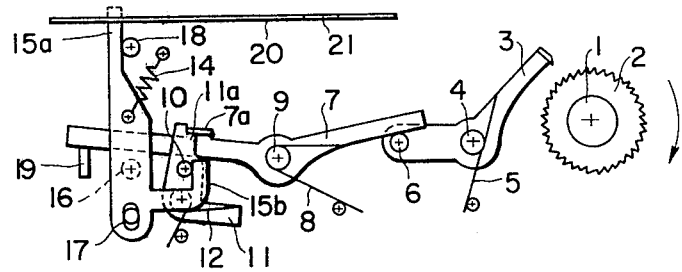

Referring still further to FIG. 1 and to FIG. 2, reference numeral 18 designates the stopper of the detection lever and 19, the set lever of the shutter or the mirror. The set lever 19, is moved downwardly when the camera is set and moved upwardly when the shutter or the mirror has been operated. Finally, a film 20 and a perforation 21 of the film 20 are shown.

The operation of the film stop position adjusting mechanism thus constructed will be described.

The winding operation changes the state of the mechanism as shown in FIGS. 1, 2, 3 and 4 in the stated order. More specifically, FIGS. 1 and 2 show the states of the mechanism before the winding operation is carried out. FIG. 2 shows the state of the mechanism when the cartridge, or the film 20, is loaded in the camera. Upon loading the film 20, the detection lever protrusion 15a is depressed by the film 20 to cause the detection lever 15 to move downwardly.

The film 20 is moved left by the winding operation. Therefore, when the perforation 21 passes over the protrusion 15a, the latter 15a is inserted into the perforation 21. As a result the detection lever protrusion 15a is positioned as indicated by the broken lines.

Figure 3:
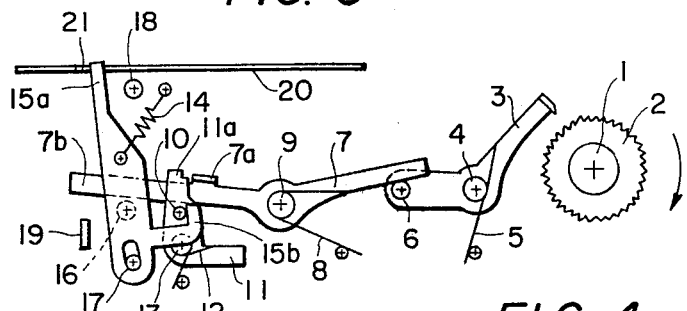
Figure 4:
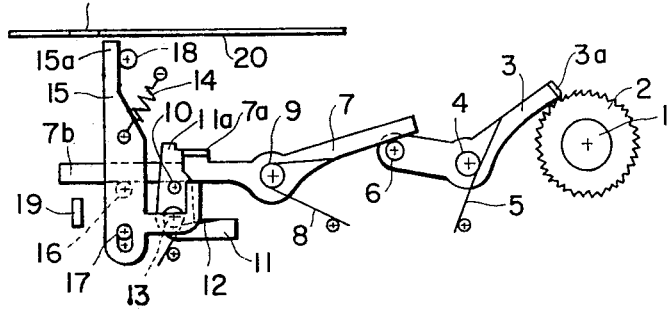

When the film is further wound, then the film 20 is moved to the left and the protrusion 15a in the perforation 21 is also moved, pivoted to left. As a result the detection lever 15 is inclined to the left (FIG. 3). Simultaneously, the arm 15b also is inclined to the left, and the adjustable eccentric pin 10 embedded in the locking lever 11 is depressed left. As a result, the locking lever 11 is turned counterclockwise around the shaft 13, and therefore the step 11a of the locking lever 11 is disengaged from the bent portion 7a of the ratchet releasing lever.

At this time instant, the set lever 19 is locked at the position shown as FIG. 3 by a mechanism (not shown). As soon as the step 11a is disengaged from the bent portion 7a, the ratchet releasing lever 7 is turned counter-clockwise around the shaft 9, and the pin 16 embedded in the detection lever 15 is depressed by the extended portion 7b. As a result, the protrusion 15a is moved downwardly from the perforation 21. Therefore, the detection lever 15 is turned clockwise by the spring 14 and is stopped by the stopper 18.

Simultaneously, the stop lever 3 following the releasing lever 7 is turned clockwise around the shaft 4 by the spring 5. As a result, the stop pawl 3a is engaged with the ratchet gear 2 to stop the rotation of the ratchet gear 2 and accordingly the rotation of the winding shaft 1 integral with the ratchet gear 2. Thus, feeding of the film is stopped.

Thereafter, by the release operation of the camera, the operation of the shutter or the mirror is completed. The set lever 19 is moved upwardly by the mechanism (not shown) to turn the releasing lever 7 clockwise thereby to turn the stop lever 3 counterclockwise. Thus, the mechanism is set as shown in FIG. 2 and again the winding shaft 1 can be rotated. At the same time, the releasing lever 7 is locked by the step 11a of the locking lever 11 and the bent porion 7a.

As is clear from the above description, in the mechanism according to the invention, the eccentric pin 10 whose position can be adjusted by rotation is embedded in the locking lever. Therefore, when the locking of the releasing lever 7 is released by disengaging the step 11a from the bent portion 7a, the position of the detection lever protrusion 15a, i.e., the position in the film feeding directon of the perforation can be adjusted and accurately regulated. Since the left edge of the detection lever arm 15b is a straight line substantially perpendicular to the film feeding direction, the position, in the film feeding direction, of the detection lever protrusion 15a can be accurately regulated. Also, the film stop position can be readily and accurately adjusted, even if the position of the detection lever 15 in a direction (which is the direction of the optical axis) perpendicular to the film feeding direction is unstable. Thus, the mechanism according to the invention considerably facilitates the assembling of the camera.

What is claimed is:

1. A film stop position adjusting mechanism comprising:
    a stop lever (3) engagable with a ratchet gear (2) and adapted to stop the feeding of a film having a protrusion;
    a ratchet releasing lever (7) for holding said stop lever (3) at a release position, said ratchet releasing lever having a bent portion (7a);
    a locking lever (11) having a step (11a) engaging said bent portion (7a) of said ratchet releasing lever to lock said ratchet releasing lever;
    a detection lever having a protrusion (15a) insertable into a perforation of said film to detect a film stop position, and an arm (15b) having a straight edge portion and
    said locking lever (11) provided with a pin (10) whose position can be adjusted by rotation, said pin engaging with said arm (15b) of said detection lever adapted to detect a film stop position by insertion of said protrusion (15a) into a film perforation, and wherein said film stop position is adjusted by changing the timing at which said step (11a) is disengaged from said bent portion (7a).

2. A film stop position adjusting mechanism as in claim 1 further comprising a stop pawl (3a) on one end of said stop lever, said stop pawl engaging said ratchet gear and, spring means to bias said stop lever into engagement with said ratchet gear.

3. A film stop position adjusting mechanism as in claim 1 wherein said ratchet releasing lever further comprises an extended portion (7b), and further comprising a charge lever adapted to contact said extended portion to move said stop lever upon a shutter release operation of the camera to permit winding of said film.

4. A film stop position adjusting mechanism of claim 3 further comprising means to bias said ratchet release lever into contact with said charge lever.

5. A film stop position adjusting mechanism of claim 1 wherein the straight edge portion of said arm (15b) is substantially perpendicular to a film feeding direction.

6. A film stop position adjusting mechanism of claims 1 or 5 further comprising means to bias said locking lever into contact with said bent portion.

7. A film stop position adjusting mechanism of claims 1, 2, 3, 4 or 5 further comprising a shaft (10a) coupling said pin to said locking lever, said shaft being positioned away from the axial center of said pin such that rotation of said pin is eccentric relative to said shaft.

* * * * *